UNITED STATES PATENT OFFICE.

ANTOINE M. F. CHEVET, OF ST. JAMES PARISH, LOUISIANA.

IMPROVEMENT IN THE MANUFACTURE OF SUGAR.

Specification forming part of Letters Patent No. 4,985, dated February 27, 1847.

*To all whom it may concern:*

Be it known that I, ANTOINE MARIE FELIX CHEVET, living during the last seven years in the parish of St. James, State of Louisiana, have invented a new and Improved Method of Defecating or Purifying the Sugar-Cane Juice; and I do hereby declare the following to be a full and exact description of it.

It consists in heating the cane-liquor to a higher temperature than ebullition-points under atmospheric pressure, according to the quality of the can-juice, in order to destroy and separate the greatest portion of feulancies and other matters or impurities; and I obtain this increase of temperature by an increase of pressure in heating in a closed kettle of any form whatever and furnished with a pipe immersed in the cane-juice and having communication with any vessel whatever, where the contents of the cane-liquor with any purifying agent—lime, for example—may be established without continuing the influence of the fire on the liquor, which is consequently in a proper condition for depositing or precipitating any insoluble or coagulated matter or other impurity.

The upper part of the kettle may be furnished with an air-pipe, to be opened or shut at pleasure.

When the liquor is in ebullition I shut the air-pipe and the inner pressure increases, and consequently the temperature of the liquor also; and when I think this temperature sufficient for the proposed coagulation of albuminous matters and destroying other impurities, according to the condition of the juice in operation, I open the larger pipe immersed in the cane-liquor, and the inner pressure being higher than the atmospheric pressure, all the liquor over the lower orifice of this larger pipe is expelled, and may be directed into the vessel where it is intended to establish contact with any purifying agent—lime, for example—and when the kettle is loaded again for another operation by an aperture attached to it and intended for this purpose.

I do not give a description of an apparatus, because any whatever may be employed, provided that a pressure higher than atmospheric pressure be produced within. Besides, what I claim as my invention, and what I desire to secure by Letters Patent, is not an apparatus, but the application of a temperature (higher than the temperature of ebullition under the atmospheric pressure) to the sugar-cane juice in order to destroy the greatest part of the matters injurious to the sugar, and using increase of pressure which results from it for removing the liquor out of the kettle and carrying it in contact with a purifying agent—lime, for example—in such a manner the juice is protected against fire during the defecation or purifying and during the deposit of coagulated matters and other impurities.

It is plain that Letters Patent only for an apparatus prepared to obtain these results would be completely without interest to your petitioner, because any one may obtain them with an apparatus of any particular form conveniently adapted for this object on the same principles, and it is possible to employ a great many forms.

In order to point out the importance of my new method I wish to make a few remarks: Every sugar-maker knows that a great deal of the impurities cannot be destroyed, except at the end of the evaporation, because it is only at that moment that the temperature is sufficiently high, and this is the reason why I commence with heating strongly the cane-juice in order to obtain the separation at the beginning of the operation, so as to secure the sugar from the destructive effects arising from these impurities during the whole evaporation; and every sugar-maker knows that it is a great inconvenience for the juice to be constantly in motion by ebullition, as in such case it is impossible to obtain a complete separation of insoluble matters. It is plain that my new mode of operating avoids this inconvenience, because that during and after purifying or defecating the liquor is away from the fire, and may allow the matters separated by purifying to be precipitated without motion or any disturbance.

CHEVET.

Witnesses:
V. CHOPPIN,
A. B. NORMAN.